(12) United States Patent
Yamamoto et al.

(10) Patent No.: US 7,867,315 B2
(45) Date of Patent: Jan. 11, 2011

(54) HARD-PARTICLE POWDER FOR SINTERED BODY AND SINTERED BODY

(75) Inventors: Tomomi Yamamoto, Nagoya (JP); Seiji Kurata, Nagoya (JP)

(73) Assignee: Daido Tokushuko Kabushiki Kaisha, Aichi (JP)

( * ) Notice: Subject to any disclaimer, the term of this patent is extended or adjusted under 35 U.S.C. 154(b) by 236 days.

(21) Appl. No.: 12/314,945

(22) Filed: Dec. 19, 2008

(65) Prior Publication Data

US 2009/0165595 A1 Jul. 2, 2009

(30) Foreign Application Priority Data

Dec. 26, 2007 (JP) .............................. 2007-333736

(51) Int. Cl.
*B22F 1/00* (2006.01)
*B22F 3/00* (2006.01)
(52) U.S. Cl. .......................................... 75/255; 75/246
(58) Field of Classification Search ........................ None
See application file for complete search history.

(56) References Cited

U.S. PATENT DOCUMENTS

| 3,582,320 | A | * | 6/1971 | Herchenroeder | ............. | 420/436 |
| 5,462,575 | A | * | 10/1995 | Del Corso | ..................... | 75/243 |
| 5,529,602 | A | * | 6/1996 | Ishii et al. | ...................... | 75/231 |
| 6,793,878 | B2 | * | 9/2004 | Blake et al. | .................. | 420/436 |
| 2002/0064475 | A1 | * | 5/2002 | Kawase et al. | ................ | 419/46 |
| 2002/0168285 | A1 | | 11/2002 | Blake et al. | | |
| 2004/0000283 | A1 | * | 1/2004 | Narasimhan et al. | ..... | 123/188.8 |
| 2006/0237101 | A1 | * | 10/2006 | Ozaki | ......................... | 148/325 |
| 2007/0081914 | A1 | | 4/2007 | Yoshihiro et al. | | |

FOREIGN PATENT DOCUMENTS

| JP | 2003-193173 | 7/2003 |
| JP | 2007-107034 | 4/2007 |

OTHER PUBLICATIONS

Hou-an Zhang et al., "Effects of Rare Earth on Synthesis of MoSi2", Powder Metallurgy Technology, vol. 14, 4 (1998), pp. 258-261.
Chinese Search Report of Jul. 7, 2010 corresponding to Application No. 200810189217.6.

* cited by examiner

*Primary Examiner*—Roy King
*Assistant Examiner*—Ngoclan T Mai
(74) *Attorney, Agent, or Firm*—Bacon & Thomas PLLC

(57) ABSTRACT

The invention provides a hard-particle powder for sintered body, which contains, by mass %, 2% to 3.5% of Si, 6% to 10% of Cr, 20% to 35% of Mo, 0.01% to 0.5% of REM, and the remainder being Co and unavoidable impurities. The invention further provides a sintered body obtained through a mixing step of mixing the above-mentioned hard-particle powder for sintered body with a pure iron powder and a graphite powder to obtain a powder mixture, a forming step of compacting the powder mixture to obtain a compact, and a sintering step of sintering the compact. The hard-particle powder according to the invention has the effect of giving a sintered body having improved wear resistance without substantially impairing powder characteristics and sintering characteristics. Additionally, the sintered body according to the invention has the effect of having excellent wear resistance.

2 Claims, 3 Drawing Sheets

HARD-PARTICLE POWDER FOR SINTERED BODY AND SINTERED BODY

FIELD OF THE INVENTION

The present invention relates to a hard-particle powder for sintered body and a sintered body. More particularly, the invention relates to a technique for improving the wear resistance of automotive-engine valve seats by adding REM to a hard-particle powder, without substantially impairing powder characteristics and sintering characteristics.

BACKGROUND OF THE INVENTION

Tribaloy T-400 is known as hard particles having high wear resistance which are based on cobalt forming a hard phase constituted mainly of a molybdenum silicide.

A powder of a Co-2.5Si-28Mo-8.5Cr alloy, which is a material comparable to Tribaloy T-400, has been used in large quantities as hard particles greatly contributing to the wear resistance of automotive-engine valve seats (hereinafter referred to simply as "valve seats") in automotive engines operated under high load. Therefore, a lot of techniques have been proposed.

For example, patent document 1 discloses, for the purpose of dispersing a larger amount of a hard layer in a matrix without impairing wear resistance, strength, etc., a process for producing a wear-resistant sinter member which comprises compacting a raw powder containing a matrix-forming powder (iron, SUS316, SUS304, SUS310, or SUS430) and a hard-layer-forming powder (Co-28Mo-2.5Si-8Cr), followed by sintering the compact, in which, at least 90% by mass of the matrix-forming powder is a fine powder having a maximum particle diameter of 46 μm, and the proportion of the hard-layer-forming powder in the raw powder is 40-70% by mass.

Patent document 2 discloses, for the purpose of obtaining an iron-based sinter alloy material having excellent wear resistance, a process for producing a wear-resistant iron-based alloy material for valve seats, in which 100 parts by weight of an iron-based alloy powder composed of a pure iron powder, iron alloy powder, carbon powder, steel powder having a fine carbide deposit, and hard-particle powder (e.g., Cr—Mo—Co system or Ni—Cr—Mo—Co system) is mixed with 0.2-3.0 parts by weight of a solid lubricant powder (sulfide or fluoride) and/or 0.2-5.0 parts by weight of a stabilized oxide powder ($Y_2O_3$ or $CeO_2$, which each is an oxide of a rare-earth element, or $CaTiO_3$), and the resultant iron-based alloy powder is compacted and formed, followed by sintering the compact to obtain a sintered body.

Patent Document 1: JP-A-2007-107034
Patent Document 2: JP-A-2003-193173

SUMMARY OF THE INVENTION

However, with the trend toward higher loads resulting from required engine characteristics, the wear resistance required of valve seat materials is also increasing.

There has hence been a problem that the hard particles disclosed in, e.g., patent documents 1 and 2 cannot sufficiently attain the wear resistance required of valve seat materials. Furthermore, it is thought that when it is attempted to obtain the improved wear resistance required of valve seat materials, powder characteristics and sintering characteristics are impaired. There is hence a desire for a technique which is capable of attaining the improved wear resistance required of valve seat materials without impairing powder characteristics and sintering characteristics.

The invention has been achieved under such circumstances. An object of the invention is to provide a hard-particle powder for sintered body which can give a valve seat having improved wear resistance without substantially impairing powder characteristics and sintering characteristics. Another object of the invention is to provide a sintered body having excellent wear resistance.

In order to overcome the problems described above, the present inventors diligently made investigations on techniques for improving the wear resistance of valve seats using a Co-2.5Si-28Mo-8.5Cr alloy powder. In the course of the investigations, the inventors found that the wear resistance of valve seats can be improved by adding REM to the hard particles. It was also found that the addition of REM to the hard particles impairs neither powder characteristics nor sintering characteristics.

The invention has been achieved based on these findings. Namely, the invention provides a hard-particle powder for sintered body, which comprises, by mass %, 2% to 3.5% of Si, 6% to 10% of Cr, 20% to 35% of Mo, 0.01% to 0.5% of REM, and the remainder being Co and unavoidable impurities.

In this case, the hard-particle powder for sintered body according to the invention may further contain 0.1% by mass or lower of C and 1% by mass or lower of Mn.

The invention further provides, in order to overcome the problems, a sintered body obtained through a mixing step of mixing the above-mentioned hard-particle powder for sintered body according to the invention with a pure iron powder and a graphite powder to obtain a powder mixture, a forming step of compacting the powder mixture to obtain a compact, and a sintering step of sintering the compact.

The hard-particle powder according to the invention has the effect of giving a sintered body having improved wear resistance without substantially impairing powder characteristics and sintering characteristics, because it contains, by mass %, 2% to 3.5% of Si, 6% to 10% of Cr, 20% to 35% of Mo, and 0.01% to 0.5% of REM. Consequently, this powder is especially suitable for use as a material for valve seats.

The sintered body according to the invention has the effect of having excellent wear resistance because it is a sintered body obtained using the hard-particle powder for sintered body according to the invention as a raw material.

The hard-particle powder for sintered body and the sintered body according to the invention are effective in improving the wear resistance of valve seats without impairing powder characteristics and sintering characteristics. Therefore, the hard-particle powder and sintered body of the invention have a high industrial use value in the automobile industry and in various allied industries.

BEST MODE FOR CARRYING OUT THE INVENTION

Figure 1:
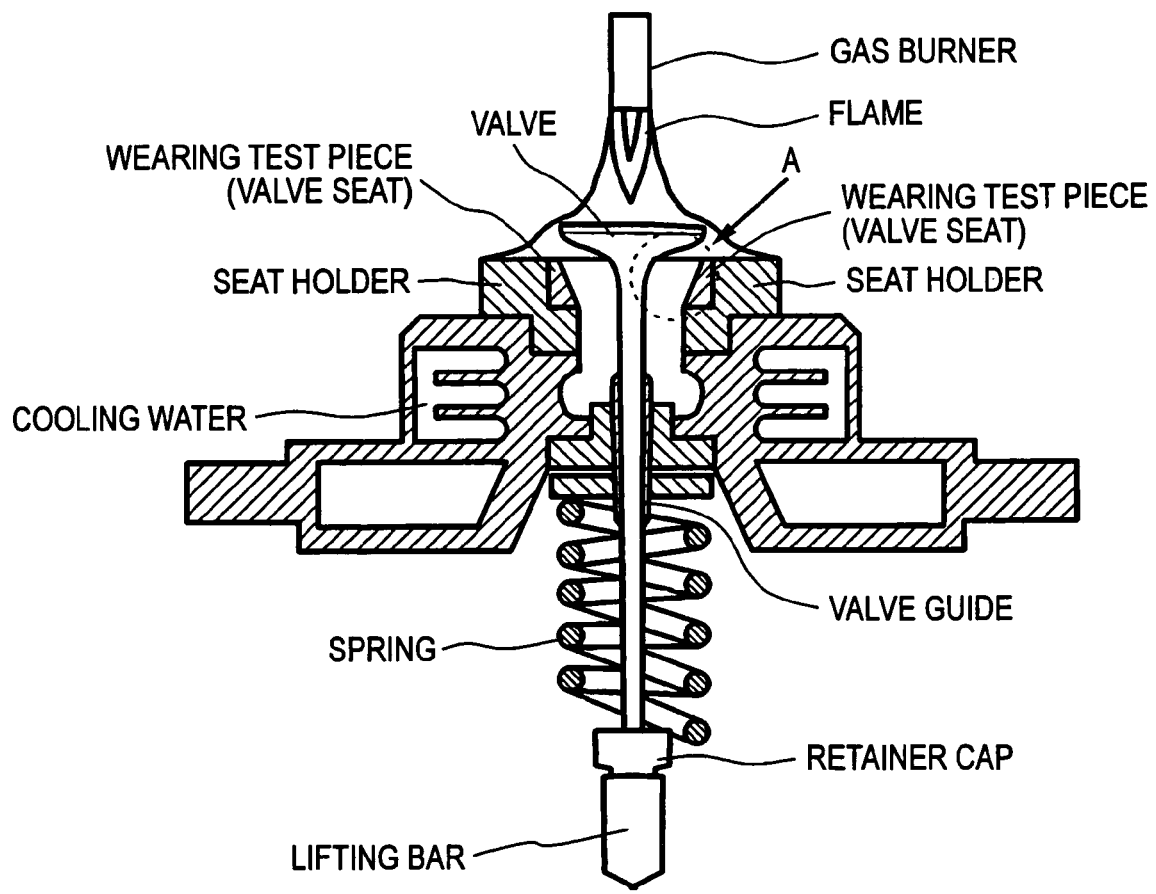
FIG. 1 is a sectional view diagrammatically illustrating a wear tester for testing a valve seat itself

Embodiments of the invention will be explained below in detail by reference to the drawings.

(Composition of the Hard-Particle Powder for Sintered body)

The hard-particle powder for sintered body of the invention contains silicon (Si), chromium (Cr), molybdenum (Mo), and REM as essential constituent elements besides cobalt (Co) as a base. The contents of carbon (C) and manganese (Mn) which are unavoidable impurities in the powder may be positively controlled.

The reasons for limitations on the contents of those elements are explained below. Herein, in the present specification, all the percentages defined by mass are the same as those defined by weight, respectively.

(1) 2% by Mass≦Si≦3.5% by Mass

Silicon (Si) is an ingredient incorporated for the purpose of improving hardness through the formation of a silicide. The reason why the lower limit of silicon amount is 2% by mass is that powder particles having a silicon content lower than the lower limit are too low in hardness to function as hard particles. The reason why the upper limit of silicon amount is 3.5% by mass is that powder particles having a silicon content higher than the upper limit have too high a hardness and hence give a sintered body (valve seat) which suffers powder particle shedding due to cracking and has an increased amount of wear.

(2) 6% by Mass≦Chromium≦10% by Mass

Chromium (Cr) is an ingredient incorporated for the purpose of maintaining oxidation resistance. The reason why the lower limit of chromium amount is 6% by mass is that powder particles having a chromium content lower than the lower limit have insufficient oxidation resistance. On the other hand, the reason why the upper limit of chromium amount is 10% by mass is that powder particles having a chromium content exceeding the upper limit is impaired in sintering characteristics.

(3) 20% by Mass≦Molybdenum<35% by Mass

Molybdenum (Mo) is an ingredient incorporated for the purpose of maintaining the hardness of the powder particles. The reason why the lower limit of molybdenum amount is 20% by mass is that powder particles having a molybdenum content lower than the lower limit give a sintered body having insufficient wear resistance. On the other hand, the reason why the upper limit of molybdenum amount is 35% by mass is that powder particles having a molybdenum content higher than the upper limit have too high a hardness and hence give a sintered body which suffers powder particle shedding due to cracking and has an increased amount of wear.

(4) 0.01% by Mass≦REM≦0.5% by Mass

In the invention, the term REM means at least one kind of the lanthanoid elements. REM is an ingredient incorporated in order to improve the wear resistance of sintered body without impairing powder characteristics and sintering characteristics. The reason why the lower limit of REM amount is 0.01% by mass is that the incorporation of REM in an amount smaller than the lower limit makes almost no contribution to an improvement in the wear resistance of sintered body. On the other hand, the reason why the upper limit of REM amount is 0.5% by mass is that REM incorporation in an amount exceeding the upper limit also makes no contribution to an improvement in wear resistance and causes a larger amount of powder particles to be oxidized, resulting in poor sintering characteristics. The content of REM is preferably 0.2% by mass or lower.

The hard-particle powder for sintered body of the invention may further contain 0.1% by mass or lower of carbon (C) and 1% by mass or lower of manganese (Mn).

The reason why the upper limit of carbon amount is 0.1% by mass is to inhibit the deterioration of toughness due to the formation of carbide.

The reason why the upper limit of manganese amount is 1% by mass is that manganese incorporation in an amount exceeding the upper limit causes a larger amount of powder particles to be oxidized, resulting in poor sintering characteristics.

The reasons why the remainder is constituted of cobalt (Co) and unavoidable impurities is that cobalt is the base of the hard-particle powder for sintered body of the invention.

To sum up, the hard-particle powder for sintered body of the invention more preferably is a hard-particle powder for sintered body which contains, by mass %, 2% to 3.5% of Si, 6% to 10% of Cr, 20% to 35% of Mo, 0.01% to 0.5% of REM, 0.1% or lower of C, 1% or lower of Mn, and the remainder being Co and unavoidable impurities.

(Process for Producing Sintered Body)

The sintered body of the invention can be obtained through: a mixing step of mixing the hard-particle powder for sintered body having the above-mentioned composition with a pure iron powder and a graphite powder to obtain a powder mixture, a forming step of compacting the powder mixture to obtain a compact, and a sintering step of sintering the compact. In the mixing step, it is preferred to add a lubricant for compaction. Furthermore, it is desirable to conduct dewaxing before the sintering.

EXAMPLES

Examples according to the invention and Comparative Examples are explained below.

(Production of Hard-Particle Powders)

With respect to each of Examples 1 to 5 and Comparative Examples 1 to 6, the ingredient elements shown in Table 1 were mixed together in the proportion given in the table to obtain a hard-particle powder.

TABLE 1

Composition of hard-particle powder, results of wear resistance test, and conditions for the test

|  | Hard-particle powder (unit: mass %) | | | | | | | Wear resistance test of sintered body obtained from the hard-particle powder | |
| --- | --- | --- | --- | --- | --- | --- | --- | --- | --- |
|  | C | Si | Mn | Cr | Mo | REM | Co | Amount of Wear (μm) | Wearing test piece (sinter) production conditions |
| Example 1 | 0.03 | 2.7 | 0.02 | 8.5 | 28.6 | 0.08 | remainder | 15 | Mixing: 100 parts by weight of mixture composed of 69.2 mass % pure iron powder, 30 mass % hard-particle powder, and 0.8 mass % graphite powder was mixed with 0.5 parts by weight of lubricant |
| Example 2 | 0.05 | 3.3 | 0.1 | 6.5 | 33.0 | 0.1 | remainder | 17 | |
| Example 3 | 0.03 | 2.3 | 0.1 | 7.9 | 27.5 | 0.4 | remainder | 16 | |
| Example 4 | 0.07 | 3.1 | 0.3 | 9.5 | 28.0 | 0.04 | remainder | 17 | |
| Example 5 | 0.07 | 2.8 | 0.3 | 9.0 | 27.0 | 0.2 | remainder | 16 | |

TABLE 1-continued

Composition of hard-particle powder, results of wear resistance test, and conditions for the test

| | Hard-particle powder (unit: mass %) | | | | | | | Wear resistance test of sintered body obtained from the hard-particle powder | |
|---|---|---|---|---|---|---|---|---|---|
| | C | Si | Mn | Cr | Mo | REM | Co | Amount of Wear ($\mu$m) | Wearing test piece (sinter) production conditions |
| Comparative Example 1 | 0.01 | 2.3 | 0.02 | 7.9 | 28.0 | 0 | remainder | 20 | Compaction: pressure, 8 t/cm$^2$ Sintering: 1,160° C. × 1 hr; atmosphere corresponding to decomposed ammonia gas ($N_2$ + 3$H_2$ mixed gas) Processing: machining |
| Comparative Example 2 | 0.12 | 4.0 | 0.2 | 8.0 | 29.5 | 0 | remainder | 25 | |
| Comparative Example 3 | 0.012 | 1.5 | 0.3 | 5.5 | 28.0 | 0.9 | remainder | 21 | |
| Comparative Example 4 | 0.02 | 2.7 | 0.2 | 8.0 | 40.0 | 0 | remainder | 30 | |
| Comparative Example 5 | 0.02 | 3.0 | 1.1 | 12.0 | 29.0 | 0 | remainder | 33 | |
| Comparative Example 6 | 0.03 | 2.7 | 0.02 | 8.5 | 28.6 | 0.6 | remainder | 22 | |

(Examination of Powder Characteristics)

Of the hard-particle powders produced, the hard-particle powders of Example 1 and Comparative Example 1 were examined for powder characteristics (particle size distribution, apparent density, flowability, and powder hardness). The particle size distribution was determined by Japan Powder Metallurgy Association Standard JPMA P 02-1992, the apparent density by Japan Powder Metallurgy Association Standard JPMA P 06-1992, and the flowability by Japan Powder Metallurgy Association Standard JPMA P 07-1992. Furthermore, the powder hardness was measured with a microhardness tester.

Thereafter, the disk-shape and ring-shape compacts of Examples 1 to 5 and Comparative Examples 1 to 6 were degreased at 400° C. in the air for 1 hour and then sintered for 1 hour in a decomposed-ammonia atmosphere ($N_2$+3$H_2$) having a temperature of 1,160° C. to obtain sintered bodies.

(Examination of Sintering Characteristics)

Of the compacts and sintered bodies produced, the compacts and sintered bodies of Example 1 and Comparative Example 1 were examined for sintering characteristics (compact density, sinter density, chemical components, sintered

TABLE 2

Powder characteristics

| | Particle size distribution (mesh, %) | | | | | | | Powder characteristics | | |
|---|---|---|---|---|---|---|---|---|---|---|
| | / +80 | −80/ +100 | −100/ +145 | −145/ +200 | −200 +250 | −250/ +350 | −350/ | Apparent density (AD) g/cm$^3$ | Flowability (FR) s/50 g | Powder hardness HMV |
| Example 1 | 0.0 | 0.1 | 7.1 | 17.7 | 12.9 | 22.2 | 40.0 | 3.55 | 18.6 | 776 |
| Comparative Example 1 | 0.0 | 0.1 | 3.2 | 12.6 | 12.7 | 24.5 | 46.9 | 3.78 | 18.7 | 964 |

(Production of Sintered Bodies)

With respect to each of Examples 1 to 5 and Comparative Examples 1 to 6, sintered bodies were produced by the following procedure under the wearing test piece production conditions shown in Table 1.

First, 69.2% by mass pure iron powder (ASC100.29) was mixed with 30% by mass the hard-particle powder and 0.8% by mass graphite (CPB). To 100 parts by weight of the resultant mixture was added 0.5 parts by weight of Zn-St (lubricant for compaction). The ingredients were mixed to obtain a raw powder mixture for sintered body.

Subsequently, the raw powder mixtures of Examples 1 to 5 and Comparative Examples 1 to 6 each were compacted at a compaction pressure of 8 t/cm$^2$. Thus, (1) compacts of a disk shape having a diameter of 35 mm and a thickness of 14 mm were obtained with respect to Examples 1 to 5 and Comparative Examples 1 to 6; and (2) compacts of a ring shape having an outer diameter of 28 mm, inner diameter of 20 mm, and thickness of 4 mm were further obtained with respect to Example 1 and Comparative Example 1.

body hardness, radial crushing strength, high-temperature hardness, thermal diffusivity, specific heat capacity, and thermal conductivity).

The compact density (density of the compact before sintering) and sinter density (density of the sintered body after sintering) were determined by Japan Powder Metallurgy Association Standard JPMA P 09-1992. The chemical components were determined by infrared spectroscopy. The radial crushing strength was determined by examining the ring-shape sinter obtained through sintering (outer diameter, 28 mm; inner diameter, 20 mm; thickness, 4 mm) with an Amsler testing machine. The high-temperature hardness was measured with a high-temperature hardness tester. The thermal diffusivity, specific heat capacity, and thermal conductivity were determined by the laser flash method.

The results of the examination of those characteristics are shown in Table 3.

TABLE 3

| | | | Sintering characteristics | | | | | |
|---|---|---|---|---|---|---|---|---|
| | Compact density | Sinter density | Chemical components (mass %) | | | Sintered body hardness | Radial crushing strength | |
| | g/cm³ | g/cm³ | C | O | N | (HRA) | kgf/mm² | MPa |
| Example 1 | 7.11 | 6.98 | 0.82 | 0.17 | 0.035 | 37.7 | 51.4 | 504 |
| Comparative Example 1 | 7.14 | 6.98 | 0.81 | 0.14 | 0.031 | 33.9 | 57.7 | 565 |

| | High-temperature hardness (HV 5 kg) | | | | Thermal diffusivity ($10^{-2}$ cm²/s) | | | Specific heat capacity (J/(g · k)) | | | Thermal conductivity (W/(m · k)) | | |
|---|---|---|---|---|---|---|---|---|---|---|---|---|---|
| | Room temperature | 300° C. | 400° C. | 600° C. | 26° C. | 300° C. | 600° C. | 26° C. | 300° C. | 600° C. | 26° C. | 300° C. | 600° C. |
| Example 1 | 121 | 102 | 101 | 94 | 6.66 | 5.16 | 3.68 | 0.44 | 0.52 | 0.67 | 20.2 | 18.6 | 17.1 |
| Comparative Example 1 | 121 | 116 | 108 | 95 | 7.37 | 6.05 | 4.49 | 0.44 | 0.53 | 0.68 | 21.9 | 21.9 | 20.7 |

(Wear Resistance Test of Sintered Bodies)

The wear tester for testing a valve seat itself (hereinafter referred to simply as "wear tester") shown in FIG. 1 was used to conduct a wear resistance test of sintered bodies (the disk-shape sintered bodies produced). First, the disk-shape sintered bodies (diameter, 35 mm; thickness, 14 mm) of Examples 1 to 5 and Comparative Examples 1 to 6 were processed into a valve seat shape to obtain wearing test pieces. Each wearing test piece was set on the wear tester by press-fitting the test piece into the seat holder. The wear tester was operated under the test conditions shown in Table 4. While the wearing test piece was kept heated indirectly by heating the valve with a gas flame, the wearing test piece was worn by applying a hammering force thereto by cranking.

TABLE 4

| Conditions for wear resistance test | |
|---|---|
| Test period | 10 hours |
| Fuel | LPG |
| Number of contacts | 3,000 per minute |
| Temperature of wearing test piece | 300° C. |
| Valve operation | crank shaft |
| Valve rotation speed | 10 rpm |
| Valve face | Fe—21Cr—9Mn—4Ni + Co alloy welding |

Figure 2:
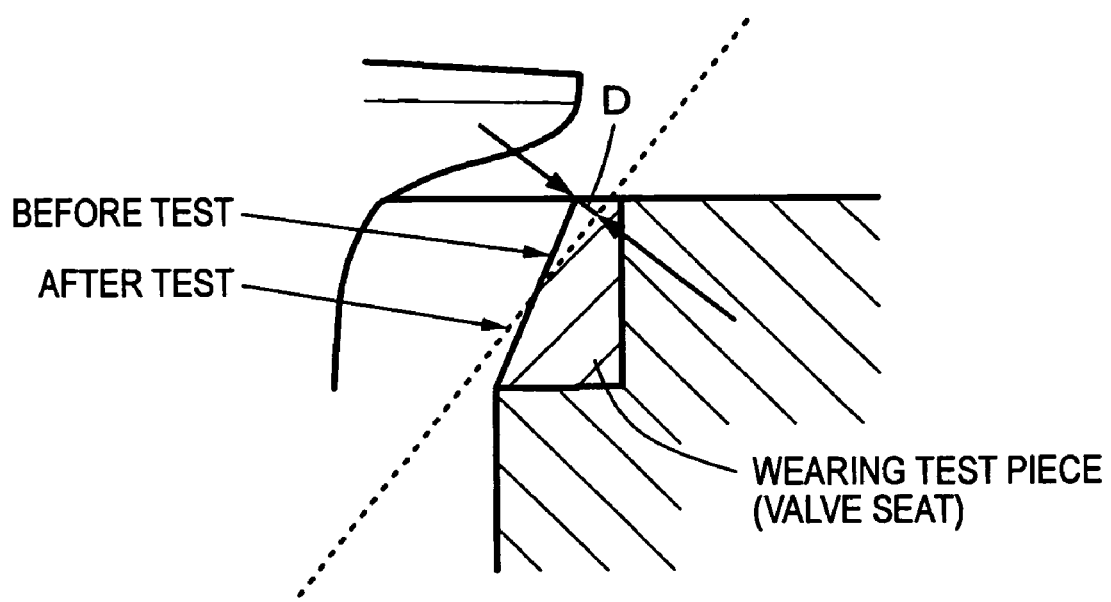
FIG. 2 is a view illustrating a part where the amount of wear of a wearing test piece is measured.
Figure 3:
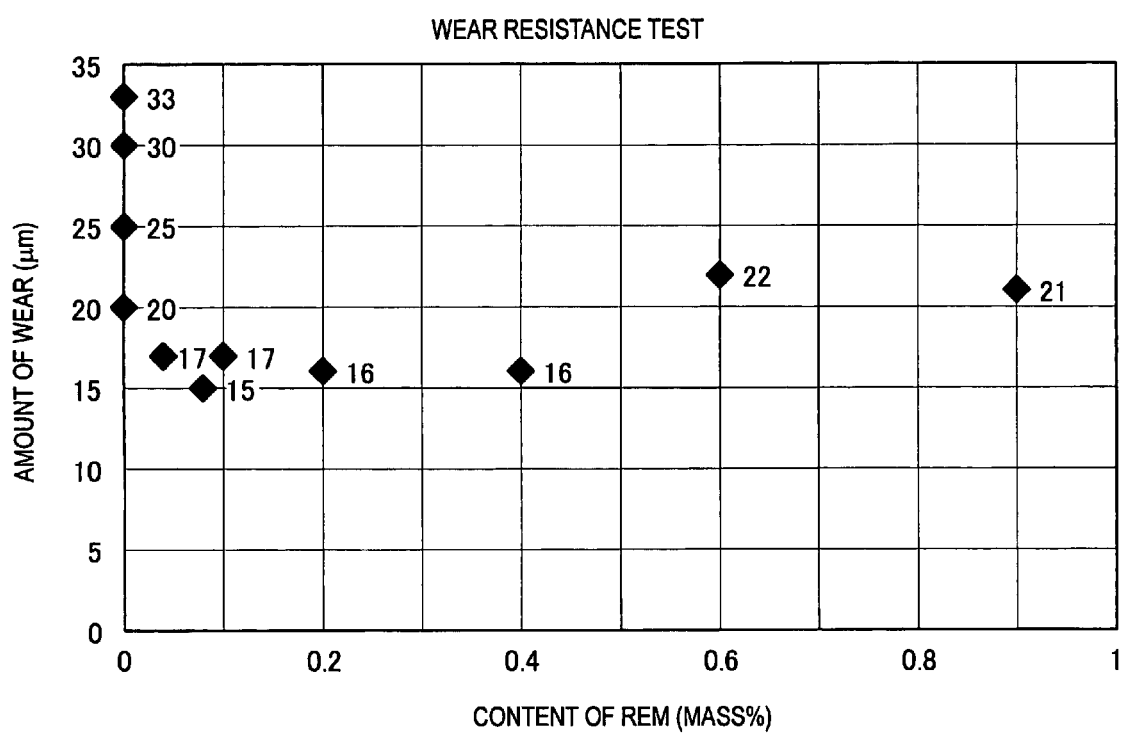
FIG. 3 is a graph obtained by plotting the relationship between the amount of wear of wearing test pieces and the content of REM.

The amount of wear of each wearing test piece was obtained by measuring the shape of the wearing test piece with a shape measuring device before and after the wear resistance test and determining the difference D in the direction perpendicular to the surface of the wearing test piece as shown in FIG. 2 (enlarged view of the part indicated by the arrow A in FIG. 1). The results obtained are shown in FIG. 3 in terms of a graph obtained by plotting the relationship between the amount of wear of wearing test pieces and the content of REM (the numeral affixed to each plotted point indicates amount of wear (μm)).

(Discussion: Wear Resistance)

Wear resistance is first discussed. As shown in Table 1 and FIG. 3, the amount of wear in each of Examples 1 to 5 was smaller than 20 μm, whereas the amount of wear in each of Comparative Examples 1 to 6 was 20 μm or larger. Namely, Examples 1 to 5 were smaller in amount of wear than Comparative Examples 1 to 6.

First, Examples 1 to 5 are compared with Comparative Example 1. The sintered bodies thereof each satisfy the preferred component content ranges according to the invention except whether REM is contained or not. Consequently, it was found that in the compositions (excluding REM) according to Examples 1 to 5, the addition of REM has the effect of improving the wear resistance of sintered bodies (valve seats).

Next, the content of REM in the case of adding REM in the compositions (excluding REM) according to Examples 1 to 5 is discussed. It can be seen that when the content of REM is too high as in Comparative Examples 3 and 6, the effect of improving the wear resistance of sintered bodies (valve seats) is not obtained. These results show that it is desirable that the content of REM should not exceed 0.6% by mass. It was thus found that the content of REM is preferably 0.5% by mass or lower, more preferably 0.2% by mass or lower.

The reason why Comparative Example 2 showed an increased amount of wear may be that the too large silicon amount resulted in too high hardness and hence in powder particle shedding.

The reason why Comparative Example 3 showed an increased amount of wear is thought to be as follows. The large REM amount resulted in an increased powder oxidation amount, i.e., poor sintering characteristics, and the small silicon amount resulted in low hardness. In addition, the small chromium amount resulted in insufficient oxidation resistance of the powder particles.

The reason why Comparative Example 4 showed an increased amount of wear may be that the too large molybdenum amount resulted in too high hardness and hence in powder particle shedding.

The reason why Comparative Example 5 showed an increased amount of wear is thought to be as follows. The large manganese amount resulted in an increased powder oxidation amount, i.e., impaired sintering characteristics, and the large chromium amount also adversely influenced sintering characteristics.

(Discussion: Characteristics Other than Wear Resistance)

The characteristics other than wear resistance (particle size distribution, powder characteristics, and sintering characteristics) are then discussed. In Table 2 are shown the particle size distributions and powder characteristics of Example 1 and Comparative Example 1. From a comparison between these, the particle size distribution and powder characteristics of Example 1 were judged to be comparable to the particle size distribution and powder characteristics of Comparative Example 1. In this connection, although the particle size distributions differed in the −100 to +145 range and the −145 to +200 range, these differences were attributable to a difference in powder production. These differences do not impair the characteristics of Example 1. With respect to powder hardness, Example 1 had a smaller value. This is attributable to a difference in silicon content between the powders, and does not impair the characteristics of Example 1.

In Table 3 are shown the sintering characteristics of Example 1 and that of Comparative Example 1. From a comparison between these, the sintering characteristics of Example 1 was judged to be comparable to the sintering characteristics of Comparative Example 1, except that Comparable Example 1 was superior in radial crushing strength. It should, however, be noted that the required level of radial crushing strength is about 40 kgf/mm$^2$ and the radial crushing strengths of Example 1 and Comparative Example 1 each were far higher than that value. Even though Example 1 is inferior to Comparative Example 1, this does not influence the properties of Example 1.

It was found from those results that the wear resistance of sintered bodies (valve seats) can be improved without substantially impairing powder characteristics and sintering characteristics, by adding REM to a hard-particle powder composed of given components. It was also found that sintered bodies having excellent wear resistance can be thus obtained.

While the invention has been described with reference to embodiments thereof, the invention should not be construed as being limited to the embodiments in any way. Although the invention is especially suitable for use as valve seats, applications of the invention should not be construed as being limited to valve seats and the invention is applicable to valve guides and other mechanical/structural parts.

The present application is based on Japanese Patent Application No. 2007-333736 filed on Dec. 26, 2007, the contents thereof being incorporated herein by reference.

What is claimed is:

1. A hard-particle powder for sintered body, which comprises, by mass %,
    2% to 3.5% of Si,
    6% to 10% of Cr,
    20% to 35% of Mo,
    0.01% to 0.5% of REM (rare earth metal), and
    the remainder being Co and unavoidable impurities.

2. A sintered body obtained through
    a mixing step of mixing the hard-particle powder for sintered body according to claim 1 with a pure iron powder and a graphite powder to obtain a powder mixture,
    a forming step of compacting the powder mixture to obtain a compact, and
    a sintering step of sintering the compact.

* * * * *